US012612872B2

(12) United States Patent
Segawa et al.

(10) Patent No.: US 12,612,872 B2
(45) Date of Patent: Apr. 28, 2026

(54) TURBOCHARGER WITH NOZZLE RING POSITIONING ASSEMBLY

(71) Applicant: IHI Corporation, Tokyo (JP)

(72) Inventors: Kenichi Segawa, Tokyo (JP); Kengo Ikeda, Tokyo (JP)

(*) Notice: Subject to any disclaimer, the term of this patent is extended or adjusted under 35 U.S.C. 154(b) by 0 days.

(21) Appl. No.: 19/294,281

(22) Filed: Aug. 8, 2025

(65) Prior Publication Data

US 2025/0361830 A1 Nov. 27, 2025

Related U.S. Application Data

(63) Continuation of application No. PCT/JP2023/036348, filed on Oct. 5, 2023.

(30) Foreign Application Priority Data

Feb. 15, 2023 (JP) ................................ 2023-021844

(51) Int. Cl.
*F02B 37/24* (2006.01)
*F02B 37/12* (2006.01)

(52) U.S. Cl.
CPC .............. *F02B 37/24* (2013.01); *F02B 37/12* (2013.01)

(58) Field of Classification Search
CPC ................................ F02B 37/12; F02B 37/24
See application file for complete search history.

(56) References Cited

U.S. PATENT DOCUMENTS

2006/0034684 A1* 2/2006 Metz .................... F01D 17/165 415/191
2011/0038742 A1 2/2011 Fleig et al.
2014/0147254 A1* 5/2014 Tashiro .................. F01D 9/045 415/146
2015/0132113 A1* 5/2015 Jaenike ................ F01D 17/165 415/160
2019/0024517 A1* 1/2019 Takeda .................... F01D 9/026
2020/0248578 A1 8/2020 Ehrhard et al.
2021/0222614 A1 7/2021 Asakawa

FOREIGN PATENT DOCUMENTS

DE 102017218303 4/2019
EP 1536103 B1 * 9/2013 ............ F01D 11/003
JP H9-090191 4/1997
JP 2001-027124 1/2001
JP 2021-076079 5/2021
WO 2020/075370 4/2020

OTHER PUBLICATIONS

English Translation of Metz et al. EP 1536103, Sep. 4, 2013 (Year: 2025).*
International Search Report dated Dec. 5, 2023 for PCT/JP2023/036348.
International Preliminary Report on Patentability with Written Opinion dated Aug. 28, 2025 for PCT/JP2023/036348.

* cited by examiner

*Primary Examiner* — Nathaniel E Wiehe
*Assistant Examiner* — Aye S Htay
(74) *Attorney, Agent, or Firm* — SHIPWAY IP

(57) ABSTRACT

A turbocharger includes a turbine impeller, a housing, a nozzle ring housed in the housing and located radially outside the turbine impeller, nozzle vanes supported by the nozzle ring, a first elastic member configured to bias the nozzle ring in an axial direction relative to the housing, a positioning assembly that includes a second elastic member configured to bias the nozzle ring so as to restrain the nozzle ring in a circumferential direction relative to the housing.

20 Claims, 12 Drawing Sheets

TURBOCHARGER WITH NOZZLE RING POSITIONING ASSEMBLY

CROSS-REFERENCE TO RELATED APPLICATIONS

This application is a continuation application of PCT Application No. PCT/JP2023/036348, filed on Oct. 5, 2023, which claims the benefit of priority from Japanese Patent Application No. 2023-021844, filed on Feb. 15, 2023. The entire contents of the above listed PCT and priority applications are incorporated herein by reference.

BACKGROUND

Field

The present disclosure relates to a turbocharger.

Description of the Related Art

Japanese Unexamined Patent Application Publication No. 2021-76079 discloses a turbocharger. The turbocharger described in Patent Literature 1 includes a turbine wheel fixed to a turbine shaft, a turbine housing that houses the turbine wheel, a bearing housing axially supporting the turbine wheel, and a variable nozzle vane mechanism disposed in a link chamber between the turbine housing and the bearing housing. The variable nozzle vane mechanism includes a ring-shaped first nozzle plate arranged on the bearing housing side, a ring-shaped second nozzle plate arranged on the turbine housing side, and a plurality of nozzle vanes arranged between the first nozzle plate and the second nozzle plate and supported by the first nozzle plate and the second nozzle plate. An elastic body that biases the second nozzle plate in a direction toward the bearing housing along the central axis of the second nozzle plate is disposed between the turbine housing and the second nozzle plate.

SUMMARY

In the above-described turbocharger, the second nozzle plate is biased in an axial direction relative to the bearing housing by the elastic body, but positioning of a nozzle ring such as the first nozzle plate and the second nozzle plate in a circumferential direction relative to the bearing housing is not particularly considered.

Disclosed herein is an example turbocharger. The turbocharger includes a turbine impeller fixed to a shaft, a housing configured to house the turbine impeller and the shaft and rotatably support the shaft, a nozzle ring housed in the housing and disposed radially outside the turbine impeller, a plurality of nozzle vanes attached to the nozzle ring so as to be disposed along a circumferential direction of the nozzle ring, a first elastic member configured to bias the nozzle ring in an axial direction relative to the housing, and a positioning unit configured to position the nozzle ring in a circumferential direction relative to the housing. The positioning unit includes a positioning pin provided on one of the housing and the nozzle ring and extending in an axial direction of the nozzle ring, a first engagement portion provided on another of the housing and the nozzle ring and engaged with the positioning pin, a second elastic member configured to bias the nozzle ring so as to restrain the nozzle ring in the circumferential direction relative to the housing, and a second engagement portion configured to engage with the second elastic member. The second elastic member and the second engagement portion are provided on at least one of the housing or the nozzle ring. That is, the second elastic member is provided on the housing or the nozzle ring, and the second engagement portion is provided on the housing or the nozzle ring. For example, both the second elastic member and the second engagement portion may be provided on the housing, or both may be provided on the nozzle ring. Further, the second elastic member may be provided on the housing and the second engagement portion may be provided on the nozzle ring, or the second elastic member may be provided on the nozzle ring and the second engagement portion may be provided on the housing.

In such a turbocharger, the positioning pin extending in the axial direction of the nozzle ring is engaged with the first engagement portion, whereby the nozzle ring is positioned in the circumferential direction relative to the housing. Then, the second elastic member is engaged with the second engagement portion of the nozzle ring to bias the nozzle ring so as to restrain the nozzle ring in the circumferential direction relative to the housing. Therefore, even if there is a gap along the circumferential direction between the positioning pin and the nozzle ring, the nozzle ring is restrained in the circumferential direction relative to the housing by the second elastic member. As a result, since rattling of the nozzle ring in the circumferential direction relative to the housing is suppressed, even when external vibration is applied to the nozzle ring, the nozzle ring is suppressed from vibrating in the circumferential direction relative to the housing. Accordingly, wear of the nozzle ring and the positioning pin is suppressed.

The positioning pin may be provided on the housing, and the first engagement portion may be provided on the nozzle ring. In such a configuration, the nozzle ring can be easily manufactured by performing processing of forming the first engagement portion and the second engagement portion on the nozzle ring in the same operation.

The housing may include an inner peripheral surface facing the nozzle ring in the axial direction, and the second elastic member may be attached to the housing so as to be arranged side by side with the positioning pin in the circumferential direction of the nozzle ring, and bias the nozzle ring in a direction intersecting an axial direction and a radial direction. In such a configuration, the nozzle ring is biased in the direction intersecting the axial direction and the radial direction by the second elastic member arranged side by side in the circumferential direction of the nozzle ring relative to the positioning pin. Therefore, the nozzle ring is reliably restrained in the circumferential direction relative to the housing.

The housing may include an inner peripheral surface facing the nozzle ring in the axial direction, and the second elastic member may be attached to the inner peripheral surface of the housing, and bias the nozzle ring in a direction intersecting an axial direction and a radial direction. In such a configuration, the nozzle ring is biased in the direction intersecting the axial direction and the radial direction by the second elastic member attached to the inner peripheral surface of the housing. Therefore, the nozzle ring is reliably restrained in the circumferential direction relative to the housing.

The nozzle ring may include an outer peripheral surface facing the housing in a radial direction of the nozzle ring, the second engagement portion may be a notch provided on the nozzle ring so as to form an opening in the outer peripheral surface of the nozzle ring and having a tapered surface, and the second elastic member may bias the tapered surface radially inward of the nozzle ring. In such a configuration, when the second elastic member biases the tapered surface of the notch of the nozzle ring radially inward of the nozzle ring, the nozzle ring is biased in the direction intersecting the axial direction and the radial direction by a composite component of the biasing force. Therefore, the nozzle ring is restrained in the circumferential direction relative to the housing by the simple structure.

The nozzle ring may include an outer peripheral surface facing the housing in the radial direction of the nozzle ring, the second engagement portion may be a notch provided on the nozzle ring so as to form an opening in the outer peripheral surface of the nozzle ring and having two inner surfaces facing each other in the circumferential direction of the nozzle ring, and the second elastic member may bias one of the two inner surfaces. In such a configuration, the second elastic member biases one inner surface of the notch of the nozzle ring, so that the nozzle ring is directly biased in the direction intersecting the axial direction and the radial direction. Therefore, the nozzle ring is restrained in the circumferential direction relative to the housing by the simple structure.

The nozzle ring may be provided with one common engagement portion constituting the first engagement portion and the second engagement portion, and the second elastic member may be disposed adjacent to the positioning pin in the circumferential direction of the nozzle ring at the common engagement portion, and bias the nozzle ring in a direction intersecting an axial direction and a radial direction. In such a configuration, even if the second elastic member is not attached to the housing, the nozzle ring is biased in the direction intersecting the axial direction and the radial direction by the second elastic member. Therefore, the nozzle ring is restrained in the circumferential direction relative to the housing while simplifying the structure of the housing.

Additionally, an example turbocharger is disclosed herein. The turbocharger according to an aspect of the present disclosure includes a turbine impeller fixed to a shaft, a housing configured to house the turbine impeller, a nozzle ring housed in the housing and disposed radially outside the turbine impeller, a plurality of nozzle vanes attached to the nozzle ring, and a positioning unit configured to position the nozzle ring relative to the housing. The positioning unit includes a positioning pin provided on at least one of the housing or the nozzle ring and extending in an axial direction of the nozzle ring, a pin engagement portion configured to engage with the positioning pin to position the nozzle ring in a circumferential direction relative to the housing, and an elastic body configured to bias the nozzle ring so as to restrain the nozzle ring in a circumferential direction relative to the housing.

Furthermore, an elastic body engagement portion provided on at least one of the housing or the nozzle ring and engaged with the elastic body may be provided.

DETAILED DESCRIPTION

In the following description, with reference to the drawings, the same reference numbers are assigned to the same components or to similar components having the same function, and overlapping description is omitted.

Figure 1:
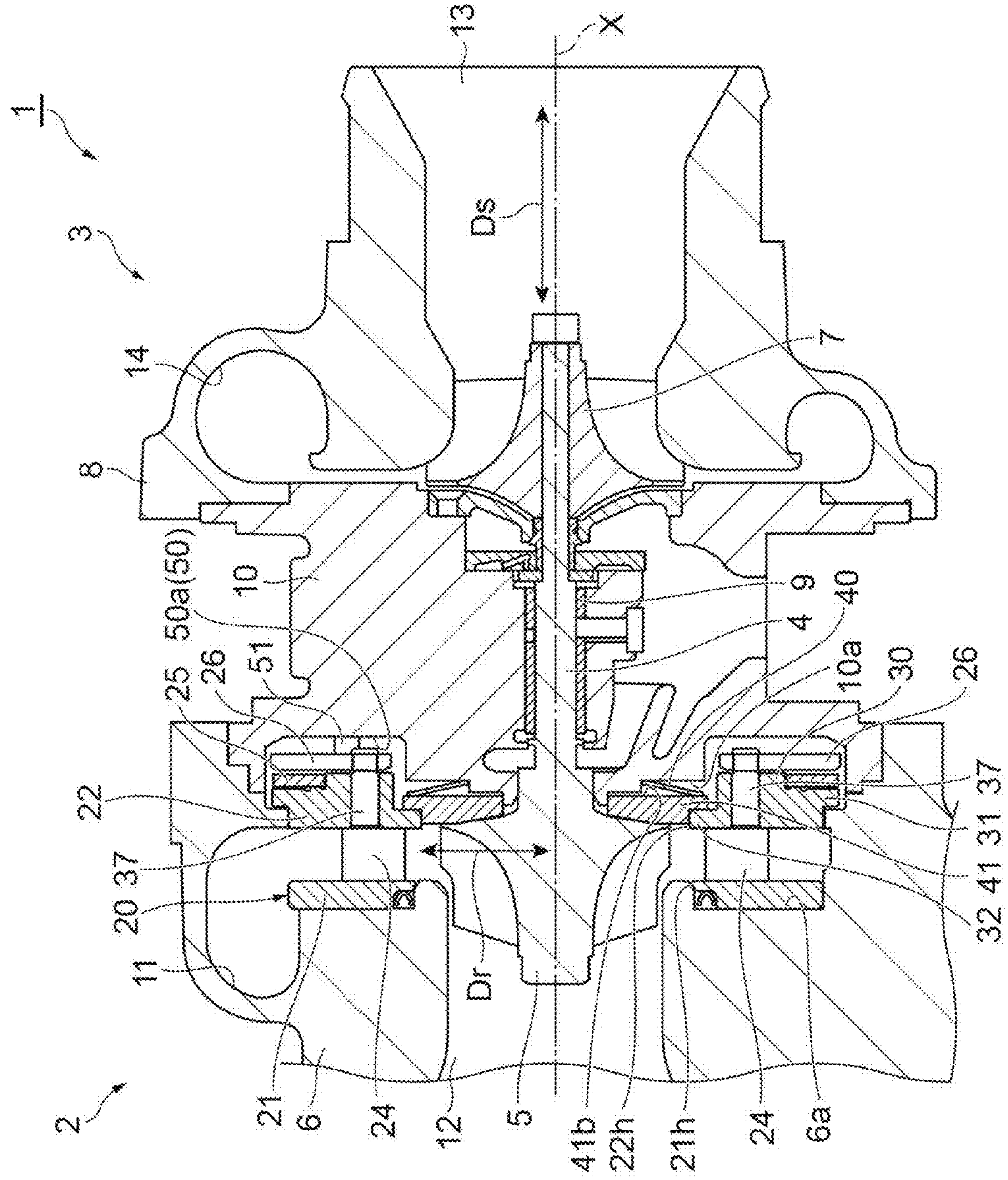
FIG. 1 is a cross-sectional view illustrating an example turbocharger.

FIG. 1 is a cross-sectional view illustrating an example turbocharger. In FIG. 1, a turbocharger 1 is a variable capacity turbocharger. The turbocharger 1 is applied to, for example, an engine of a vehicle or a ship.

The turbocharger 1 includes a turbine 2, a compressor 3, and a shaft 4 that connects the turbine 2 and the compressor 3. The turbine 2 includes a turbine impeller 5 and a turbine housing 6. The compressor 3 includes a compressor impeller 7 and a compressor housing 8.

The turbine impeller 5 is fixed to one end of the shaft 4. The compressor impeller 7 is fixed to the other end portion of the shaft 4. A bearing housing 10 is disposed between the turbine housing 6 and the compressor housing 8. The bearing housing 10 is fixed to the turbine housing 6 and the compressor housing 8. The bearing housing 10 houses the shaft 4 and rotatably supports the shaft 4 via a bearing 9.

The turbine housing 6 houses the turbine impeller 5. The turbine housing 6 includes a scroll flow passage 11 and an outlet 12 communicating with the scroll flow passage 11. The scroll flow passage 11 is provided around the turbine impeller 5. Exhaust gas discharged from the engine flows into the turbine housing 6 from an inlet, and then flows through the scroll flow passage 11 to be guided to the turbine impeller 5, thereby rotating the turbine impeller 5. The exhaust gas then flows out of the turbine housing 6 through the outlet 12.

The compressor housing 8 houses the compressor impeller 7. The compressor housing 8 includes a suction port 13 and a scroll flow passage 14 communicating with the suction port 13. The scroll flow passage 14 is provided around the compressor impeller 7. When the turbine impeller 5 rotates, the compressor impeller 7 rotates via the shaft 4. Then, external air is sucked into the compressor housing 8 from the suction port 13. The sucked air is compressed by passing through the compressor impeller 7 and the scroll flow passage 14. The compressed air is discharged from a discharge port and supplied to the engine.

Figure 2:
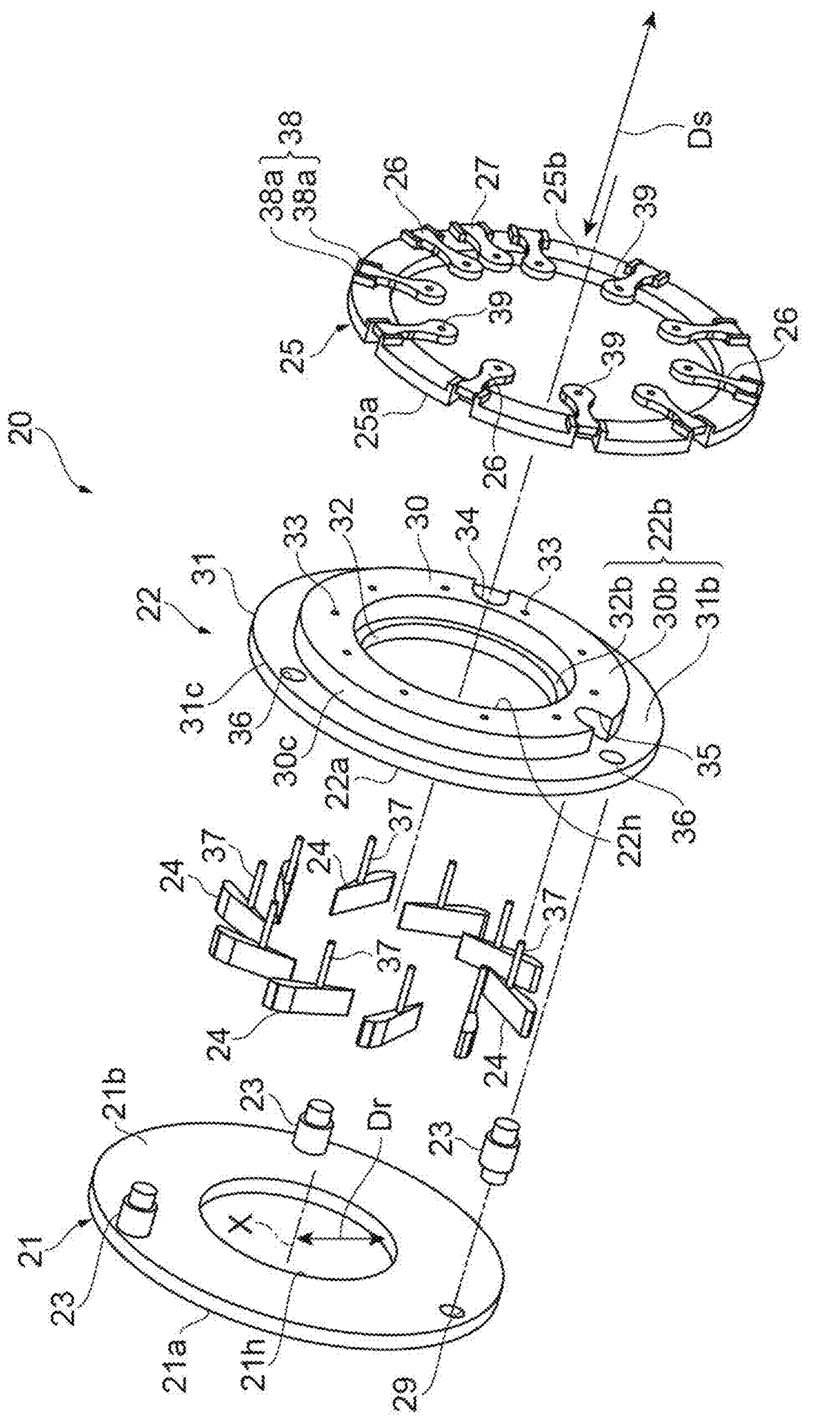
FIG. 2 is an exploded perspective view of a variable capacity mechanism.

Further, as also illustrated in FIG. 2, the turbine 2 includes a variable capacity mechanism 20 that adjusts the nozzle opening (capacity). The variable capacity mechanism 20 includes a CC plate (clearance control plate) 21, a nozzle ring 22, a CC pin (clearance control pin) 23, a plurality of nozzle vanes 24, a drive ring 25, a plurality of nozzle link plates 26, and a drive link plate 27.

The CC plate 21 has a disk shape. The center axis of the CC plate 21 coincides with a rotation axis X of the shaft 4. The CC plate 21 is disposed around the rotation axis X so as to surround the turbine impeller 5. The CC plate 21 is disposed radially outside the turbine impeller 5. The radially outside means a position farther from the rotation axis X in a radial direction Dr than a certain reference (for example, the turbine impeller 5). Further, the radially inside means a position closer to the rotation axis X in the radial direction Dr than the certain reference.

The CC plate 21 has a plate main surface 21*a* facing an inner wall surface 6*a* of the turbine housing 6 and a plate back surface 21*b* facing the nozzle ring 22. The plate back surface 21*b* is a surface of the CC plate 21 opposite to the plate main surface 21*a*. The CC plate 21 is provided with a plate hole 21*h* penetrating from the plate main surface 21*a* to the plate back surface 21*b*. Further, the CC plate 21 is provided with a plurality of (for example, three) pin holes 29. The pin holes 29 are arranged, for example, at equal intervals along the circumferential direction De of the CC plate 21.

The nozzle ring 22 has a disk shape. The center axis of the nozzle ring 22 coincides with the rotation axis X of the shaft 4. The nozzle ring 22 is positioned closer to the bearing housing 10 than the CC plate 21 in the direction of the rotation axis X (axial direction Ds). The nozzle ring 22 is disposed between the CC plate 21 and the bearing housing 10. The nozzle ring 22 is disposed radially outside the turbine impeller 5. The nozzle ring 22 is disposed around the rotation axis X so as to surround the turbine impeller 5 or the shaft 4.

The nozzle ring 22 includes a cylindrical ring main body 30, an outer flange portion 31 projecting radially outward from the ring main body 30, and an inner flange portion 32 projecting radially inward from the ring main body 30.

The ring main body 30 has an outer peripheral surface 30*c*. The ring main body 30 is provided with a plurality of nozzle shaft holes 33 and notches 34 and 35. The nozzle shaft holes 33 are arranged, for example, at equal intervals along the circumferential direction Dc of the ring main body 30. The notches 34 and 35 will be described in detail later.

The outer flange portion 31 has an outer peripheral surface 31*c*. The outer flange portion 31 is provided with a plurality of (here, three) pin holes 36. The center axis of the pin hole 36 coincides with the center axis of the pin hole 29 of the CC plate 21.

The nozzle ring 22 has a ring main surface 22*a* facing the plate back surface 21*b* of the CC plate 21 and a ring back surface 22*b* facing the bearing housing 10. The ring back surface 22*b* is a surface of the nozzle ring 22 opposite to the ring main surface 22*a*. The nozzle ring 22 is provided with a ring hole 22*h* penetrating from the ring main surface 22*a* to the ring back surface 22*b*. The ring back surface 22*b* includes a main body back surface 30*b*, an outer flange back surface 31*b*, and an inner flange back surface 32*b*. Part of the main body back surface 30*b* faces the nozzle link plates 26. The outer flange back surface 31*b* faces the drive ring 25.

The CC pins 23 couple the CC plate 21 to the nozzle ring 22. One end portion of the CC pin 23 is inserted into the pin hole 29 of the CC plate 21. The other end portion of the CC pin 23 is inserted into the pin hole 36 of the nozzle ring 22. The CC pin 23 defines a gap between the CC plate 21 and the nozzle ring 22. The CC pin 23 functions as a spacer that forms a gap in which the nozzle vane 24 is disposed between the CC plate 21 and the nozzle ring 22.

The plurality of nozzle vanes 24 is disposed between the CC plate 21 and the nozzle ring 22. The nozzle vanes 24 are arranged, for example, at equal intervals along the circumferential direction De of the nozzle ring 22. A nozzle shaft 37 extending toward the nozzle ring 22 is fixed to the nozzle vane 24. The nozzle shaft 37 is inserted through the nozzle shaft hole 33 of the nozzle ring 22. Then, a distal end of the nozzle shaft 37 protrudes from the main body back surface 30*b* of the nozzle ring 22. The diameter of the nozzle shaft 37 is slightly smaller than the diameter of the nozzle shaft hole 33. Thus, the nozzle shaft 37 is rotatable relative to the nozzle ring 22. A nozzle link plate 26 is fixed to the distal end of the nozzle shaft 37.

The drive ring 25 is disposed on the outer flange back surface 31*b* of the nozzle ring 22. The drive ring 25 circumferentially surrounds the ring main body 30 of the nozzle ring 22. The drive ring 25 is coaxial with the nozzle ring 22. The drive ring 25 is rotatable relative to the nozzle ring 22 about the rotation axis X.

The drive ring 25 has a ring main surface 25*a* facing the outer flange back surface 31*b* of the nozzle ring 22 and a ring back surface 25*b* facing the bearing housing 10. The ring back surface 25*b* is a surface of the drive ring 25 opposite to the ring main surface 25*a*. A plurality of nozzle link plates 26 is disposed on the ring back surface 25*b*. Further, one drive link plate 27 is also disposed on the ring back surface 25*b*.

Figure 3:
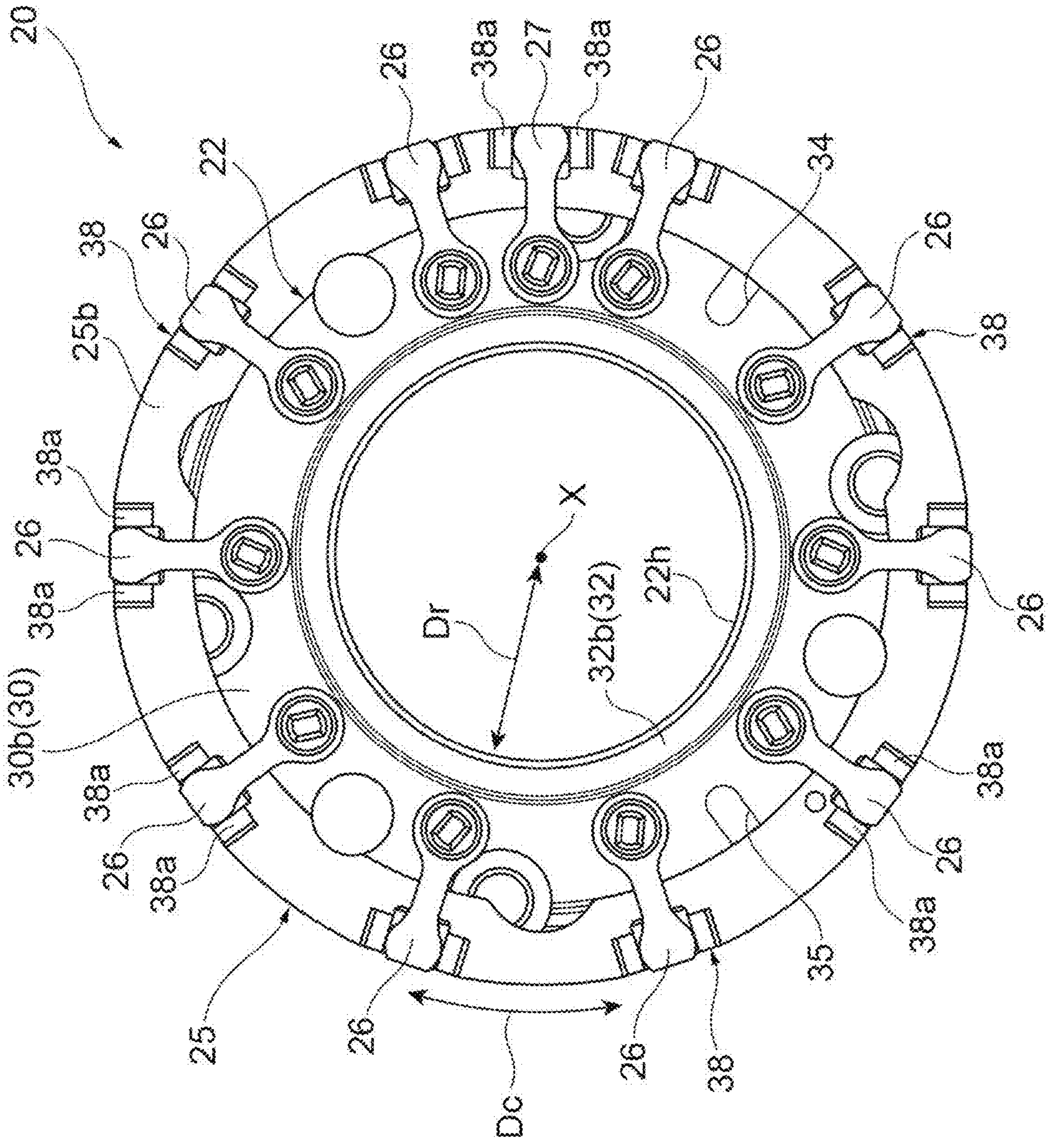
FIG. 3 is a plan view of the variable capacity mechanism.

As also illustrated in FIG. 3, the drive ring 25 has a plurality of joints 38 arranged along the circumferential direction Dc. The joint 38 includes a pair of upright portions 38*a* sandwiching a distal end of the nozzle link plate 26 and the drive link plate 27. The upright portion 38*a* protrudes from the ring back surface 25*b*. Note that FIG. 3 is a plan view of the variable capacity mechanism 20 as viewed from a side of the suction port 13 of the compressor 3.

The nozzle link plates 26 are arranged, for example, at equal intervals along the circumferential direction Dc of the drive ring 25. The number of nozzle link plates 26 is equal to the number of nozzle vanes 24. The nozzle link plate 26 has a bar shape.

A base end portion of the nozzle link plate 26 is disposed on the main body back surface 30*b* of the nozzle ring 22. A nozzle shaft hole 39 is provided at the base end portion of the nozzle link plate 26. A distal end of the nozzle shaft 37 is inserted into the nozzle shaft hole 39. In this state, the distal end of the nozzle shaft 37 is fixed to the nozzle link plate 26 by, for example, caulking.

The distal end of the nozzle link plate 26 is fitted into the pair of upright portions 38*a* of the joint 38. The distal end of the nozzle link plate 26 is merely disposed between the pair of upright portions 38*a*, and is not fixed to the upright portion 38*a*. The nozzle link plate 26 is not fixed to the drive ring 25.

The drive link plate 27 is disposed between two nozzle link plates 26 arranged in the circumferential direction Dc. The drive link plate 27 has the same structure as the nozzle link plate 26. The drive link plate 27 is coupled to a drive mechanism.

In such a variable capacity mechanism 20, when the drive ring 25 receives the driving force from the drive link plate 27, the drive ring 25 rotates about the rotation axis X. Then, the distal end of the nozzle link plate 26 moves along the circumferential direction Dc with the rotation of the drive ring 25. Thus, the nozzle link plate 26 rotates about the nozzle shaft 37. When the nozzle link plate 26 rotates, the nozzle shaft 37 rotates, so that the nozzle vane 24 rotates. Thus, the interval between the adjacent nozzle vanes 24 changes. That is, the cross-sectional area between the adjacent nozzle vanes 24 changes.

Further, in addition, the turbine 2 includes a spring member 40 (see FIG. 1) that biases the variable capacity mechanism 20 in the axial direction Ds relative to the turbine housing 6. As the spring member 40, for example, a disc spring, a coil spring, a ring spring, or the like is used. The spring member 40 constitutes a first elastic member that biases the nozzle ring 22 in the axial direction Ds relative to the turbine housing 6.

The spring member 40 is disposed in a space between a ring-shaped heat shielding plate 41 and the bearing housing 10. The heat shielding plate 41 is disposed radially inside the nozzle ring 22. The heat shielding plate 41 is held by being pressed against the inner flange portion 32 of the nozzle ring 22 by the spring member 40. The spring member 40 is disposed between a back surface **41*b* of the heat shielding plate 41 and the inner wall surface 10*a* of the bearing housing 10**.

The variable capacity mechanism 20 is positioned and held by a holding portion 50 of the bearing housing 10. The holding portion 50 has a holding surface **50*a* facing the ring back surface 22*b* of the nozzle ring 22 and the ring back surface 25*b* of the drive ring 25. The holding surface 50*a* is a part of the inner wall surface 10*a* of the bearing housing 10. The holding surface 50*a* is an example of an inner peripheral surface of the bearing housing 10, and includes a portion facing the nozzle ring 22 in the axial direction Ds and a portion facing the nozzle ring 22** in the radial direction Dr.

Figure 4:
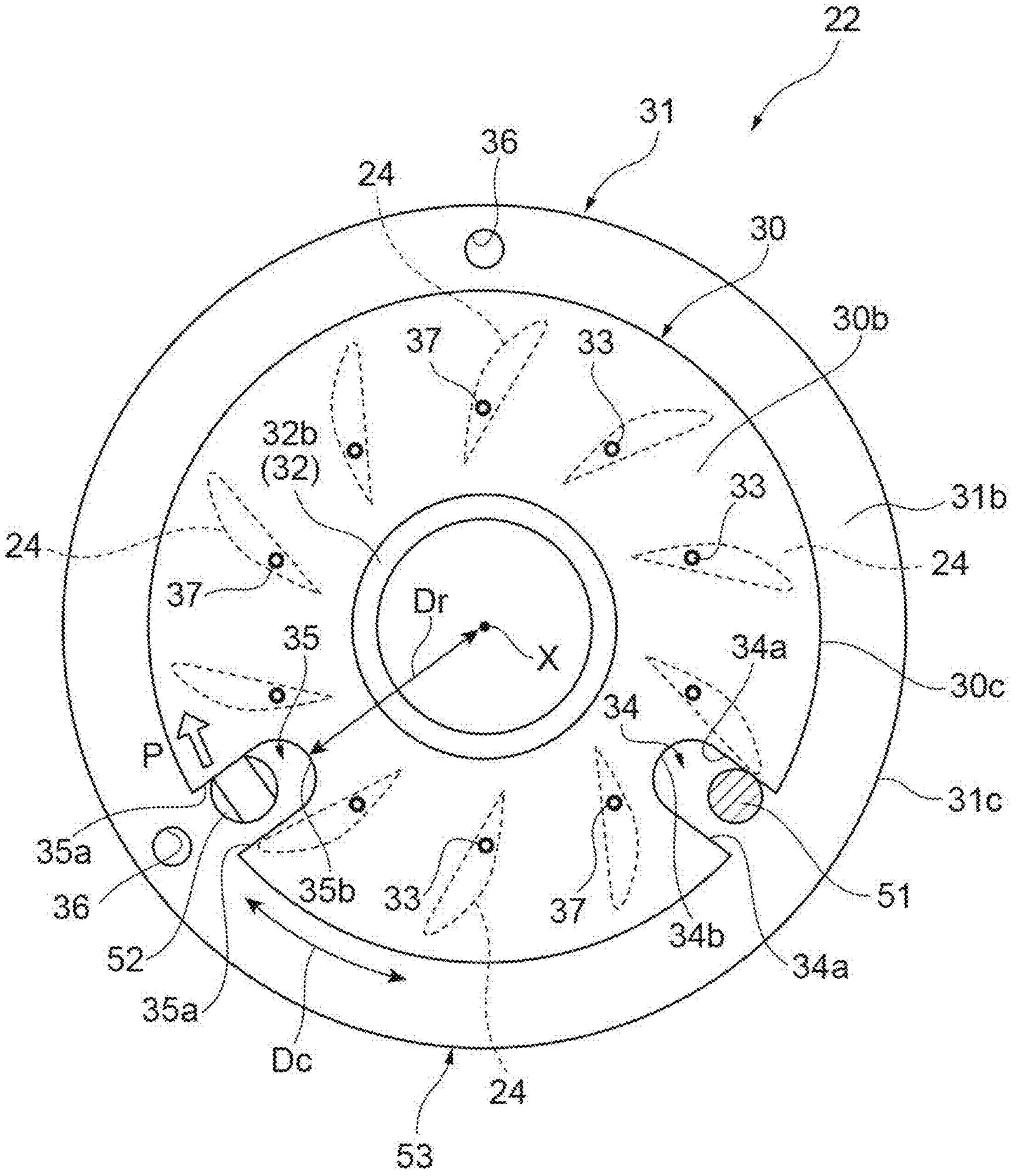
FIG. 4 is a plan view (including a partial cross section) illustrating a positioning unit together with a nozzle ring.

As illustrated in FIG. 4, the holding portion 50 is provided with a positioning pin 51 and a spring member 52. The positioning pin 51 and the spring member 52 constitute a positioning unit 53 (for example, a positioning assembly) that positions the nozzle ring 22 in the circumferential direction Dc relative to the bearing housing 10 in cooperation with the notches 34 and 35 provided on the nozzle ring 22. The positioning unit 53 includes, for example, the positioning pin 51, the spring member 52, and the notches 34 and 35. Note that FIG. 4 is a plan view of the nozzle ring 22 and the positioning unit 53 as viewed from the suction port 13 side of the compressor 3.

Figure 5A:
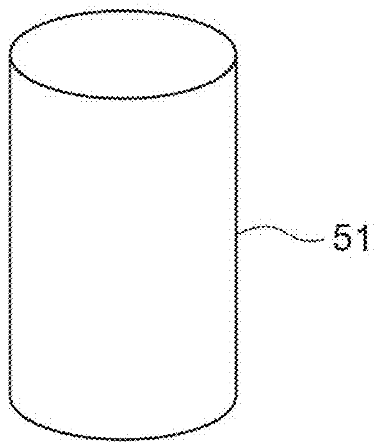
FIG. 5A is a perspective view of a positioning pin.

The positioning pin 51 is disposed at a position overlapping the notch 34 in the holding portion 50. The spring member 52 is disposed at a position overlapping the notch 35 in the holding portion 50. That is, the spring member 52 is attached to the holding portion 50 so as to be arranged side by side in the circumferential direction Dc of the nozzle ring 22 relative to the positioning pin 51. The positioning pin 51 extends in the axial direction Ds toward the nozzle ring 22. As illustrated in FIG. 5A, the positioning pin 51 has a columnar shape. Note that the shape of the positioning pin 51 is not particularly limited to a columnar shape, and may be a prismatic shape or the like.

The spring member 52 constitutes a second elastic member that biases the nozzle ring 22 so as to restrain the nozzle ring 22 in the circumferential direction Dc relative to the bearing housing 10. The spring member 52 is an example of an elastic body. The spring member 52 biases the nozzle ring 22 in a direction intersecting the axial direction Ds and the radial direction Dr. The direction intersecting the axial direction Ds and the radial direction Dr of the nozzle ring 22 is a circumferential direction Dc or a tangential direction of the nozzle ring 22. A tangential direction of the nozzle ring 22 is a direction perpendicular to the axial direction Ds and the radial direction Dr of the nozzle ring 22, and is a substantially circumferential direction Dc of the nozzle ring 22.

Figure 5B:
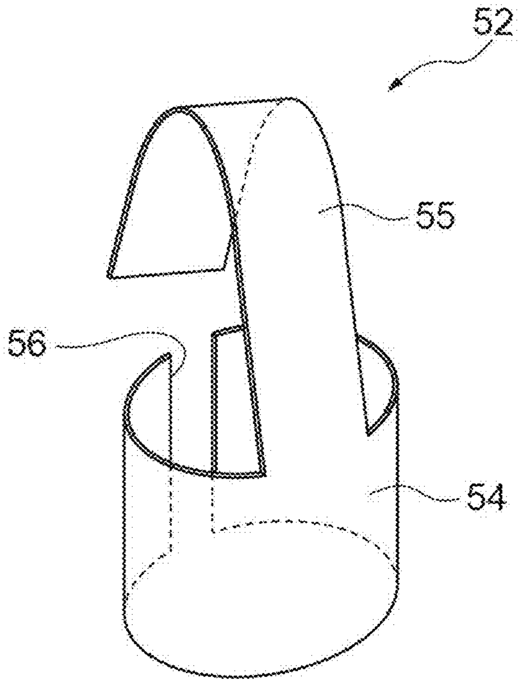
FIG. 5B is a spring member.

As illustrated in FIG. 5B, the spring member 52 has a substantially cylindrical base portion 54 and a biasing portion 55 integrated with the base portion 54. The base portion 54 is provided with a slit 56 extending in the axial direction Ds. The biasing portion 55 extends in a J shape from a portion opposite to the slit 56 at one end in the axial direction Ds of the base portion 54 toward the slit 56. Both the base portion 54 and the biasing portion 55 are elastically deformable. The spring member 52 is formed, for example, by pressing a metal thin plate into an inverted T-shape and then bending it.

Figure 6:
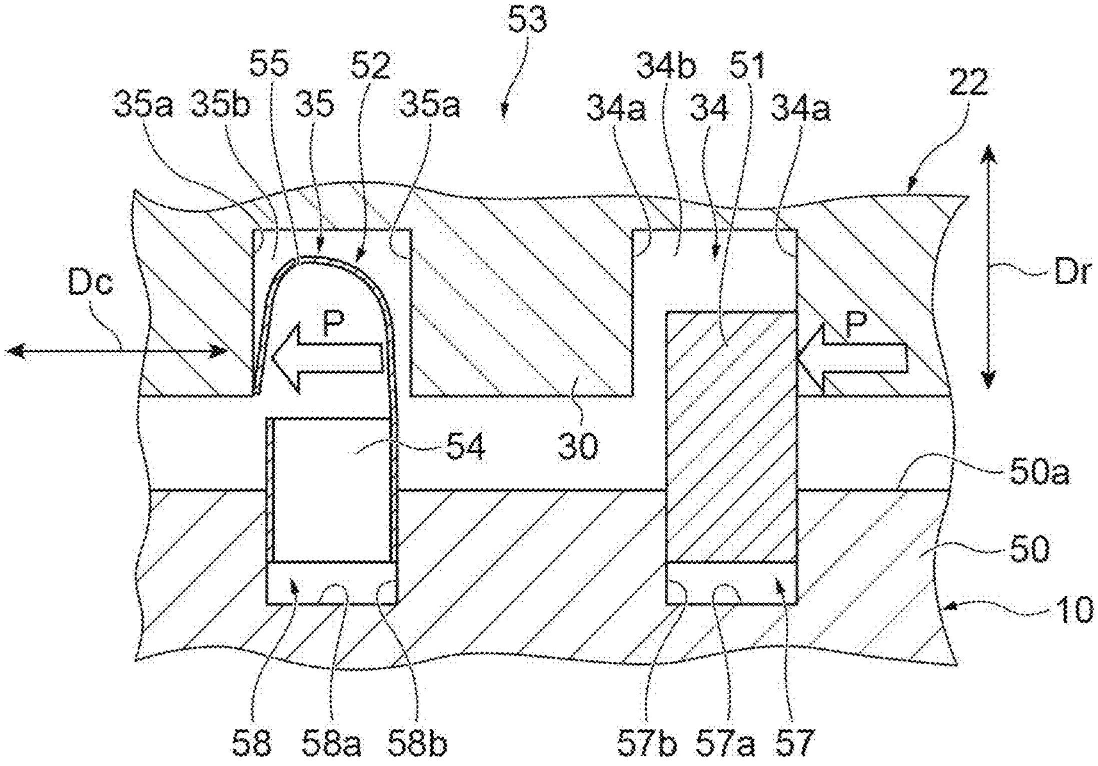
FIG. 6 is a cross-sectional view of the positioning unit illustrated in FIG. 4.

As illustrated in FIG. 6, the holding portion 50 of the bearing housing 10 is provided with attachment holes 57 and 58 having a circular cross section. The attachment holes 57 and 58 are provided so as to form an opening in a portion of the holding surface **50*a* facing the nozzle ring 22. The attachment hole 57 has a circular bottom surface 57*a* and a peripheral surface 57*b*. The attachment hole 58 has a circular bottom surface 58*a* and a peripheral surface 58*b*. Note that FIG. 6 illustrates a cross section along the circumferential direction Dc of the nozzle ring 22**.

A part of the positioning pin 51 is inserted into the attachment hole 57. A part of the base portion 54 of the spring member 52 is inserted into the attachment hole 58. At this time, since the slit 56 is provided on the base portion 54, the base portion 54 can be inserted into the attachment hole 58 in a state where the shape or diameter of the base portion 54 is adjusted to the diameter of the attachment hole 58. The positioning pin 51 is fixed to the holding portion 50 in a state of being inserted into the attachment hole 57. The spring member 52 is fixed to the holding portion 50 in a state of being inserted into the attachment hole 58.

The notches 34 and 35 are provided on the ring main body 30 of the nozzle ring 22. The notches 34 and 35 are provided so as to form an opening in the outer peripheral surface **30*c* of the ring main body 30. The notches 34 and 35 have a U shape in plan view. The notch 34 has two inner surfaces 34*a* facing each other in the circumferential direction Dc of the nozzle ring 22, and a curved inner bottom surface 34*b* connecting the inner surfaces 34*a*. The notch 35 has two inner surfaces 35*a* facing each other in the circumferential direction Dc of the nozzle ring 22, and a curved inner bottom surface 35*b* connecting the inner surfaces 35*a*. The notch 34 constitutes a first engagement portion engaged with the positioning pin 51. The engagement between the positioning pin 51 and the notch 34 means that relative movement between the positioning pin and the notch is restricted by abutting against each other. The notch 34 is an example of a pin engagement portion. The notch 35 constitutes a second engagement portion engaged with the spring member 52. The notch 35 is an example of an elastic body engagement portion that engages with the spring member 52**.

When the variable capacity mechanism 20 is assembled to the holding portion 50 of the bearing housing 10, the nozzle ring 22 is positioned in the circumferential direction Dc relative to the bearing housing 10 by the positioning unit 53.

In the turbocharger 1 illustrated in FIGS. 4 and 6, a distal end of the biasing portion 55 of the spring member 52 abuts on one inner surface **35*a* of the notch 35. Then, the distal end of the biasing portion 55 presses one of the one inner surface 35*a* by the biasing force of the biasing portion 55 (see an arrow P in the drawing). Then, the nozzle ring 22 slightly moves in the circumferential direction Dc, and the positioning pin 51 abuts on one inner surface 34*a* of the notch 34**.

Thus, the movement of the nozzle ring 22 in the circumferential direction Dc relative to the bearing housing 10 is restricted.

In the turbocharger 1 illustrated in FIG. 6, the positioning pin 51 and the spring member 52 are provided on the bearing housing 10, and the notches 34 and 35 are provided on the nozzle ring 22. However, in the example illustrated in FIG. 6, the positioning pin 51 and the notch 35 may be provided on the bearing housing 10, and the notch 34 and the spring member 52 may be provided on the nozzle ring 22.

Figure 7:
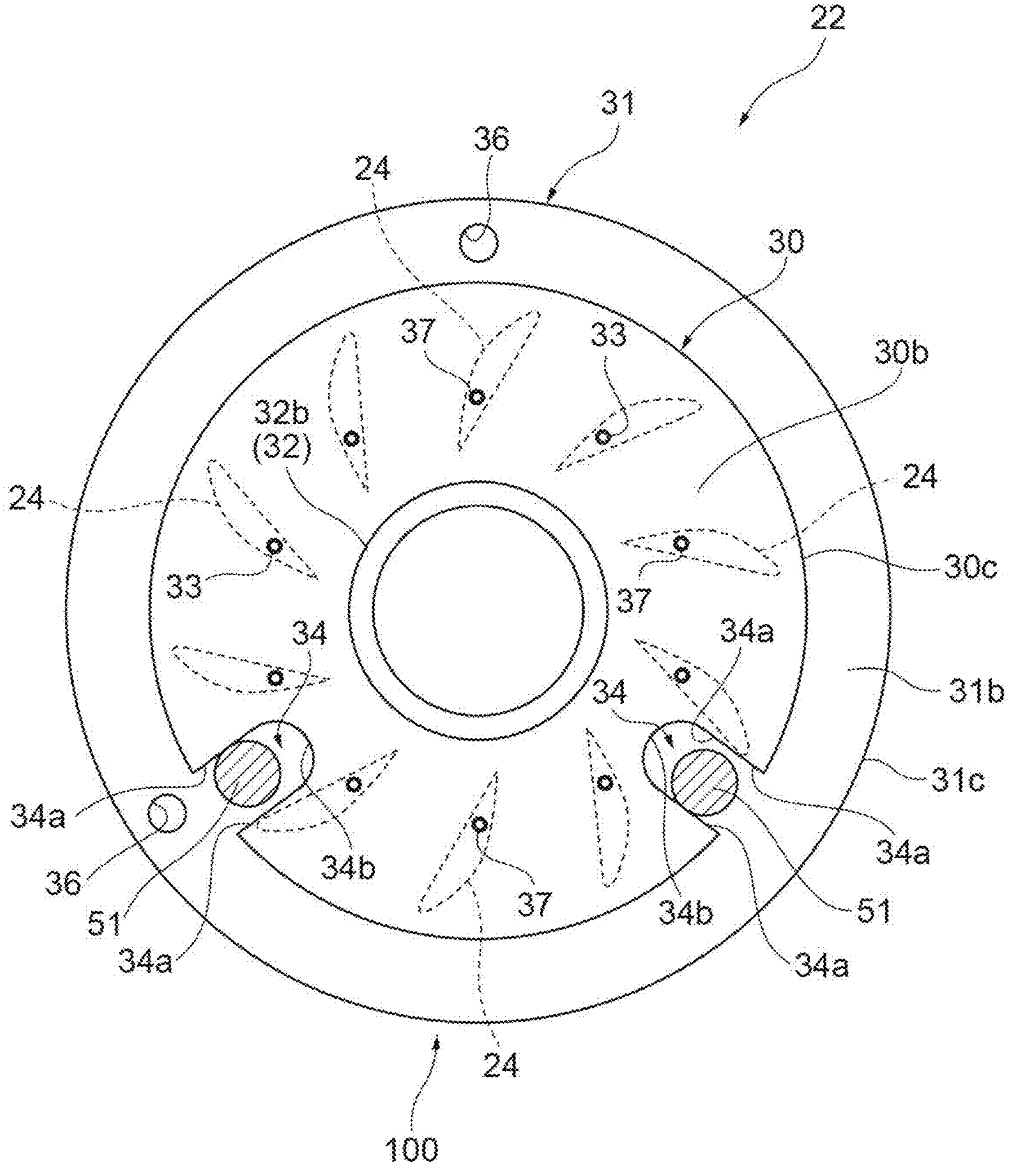
FIG. 7 is a plan view (including a partial cross section) illustrating a positioning unit as a reference example together with the nozzle ring.

FIG. 7 is a plan view illustrating the positioning unit 100 as a reference example together with the nozzle ring 22. In FIG. 7, in the positioning unit 100 of the present reference example, two positioning pins 51 are attached to the holding portion 50 of the bearing housing 10, and two notches 34 are provided on the nozzle ring 22.

Figure 8:
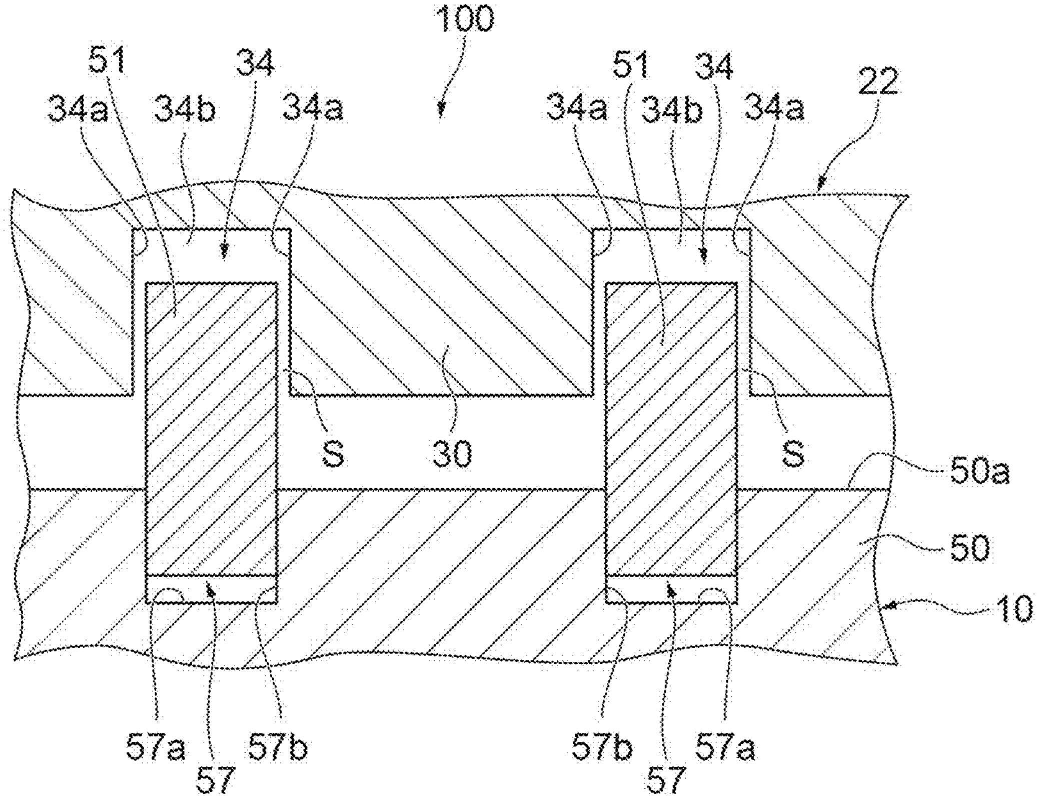
FIG. 8 is a cross-sectional view of the positioning unit illustrated in FIG. 7.

However, in such a positioning unit 100, when external vibration equal to or more than the frictional holding force by the spring member 40 is applied from the engine to the variable capacity mechanism 20, it is difficult for the nozzle ring 22 to withstand the external vibration. That is, as illustrated in FIG. 8, a gap S along the circumferential direction exists between the positioning pin 51 and the nozzle ring 22 in consideration of assemblability of the turbocharger 1. Thus, when external vibration is applied to the variable capacity mechanism 20, the nozzle ring 22 vibrates in the circumferential direction, thereby causing rattling of the nozzle ring 22 relative to the bearing housing 10, and causing wear of the nozzle ring 22 and the positioning pin 51. Note that FIG. 8 illustrates a cross section along the circumferential direction of the nozzle ring 22.

When the nozzle ring 22 and the positioning pin 51 are worn due to the vibration in the circumferential direction of the nozzle ring 22, the positional relationship of the link system for controlling the opening of the nozzle vane 24 is shifted. Thus, when the nozzle vanes 24 are excessively opened, the nozzle vanes 24 may come into contact with the turbine impeller 5 to cause damage to the nozzle vanes 24, or the nozzle vanes 24 may not be maintained at an appropriate opening. As a result, durability of the variable capacity mechanism 20 is reduced, engine output is reduced, and the like.

The positioning pin 51 illustrated in FIG. 6, the positioning pin 51 extends in the axial direction Ds of the nozzle ring 22 is engaged with the notch 34 of the nozzle ring 22, whereby the nozzle ring 22 is positioned in the circumferential direction Dc relative to the bearing housing 10. Then, the spring member 52 engages with the notch 35 of the nozzle ring 22 to bias the nozzle ring 22 so as to restrain the nozzle ring 22 in the circumferential direction Dc relative to the bearing housing 10. The engagement between the spring member 52 and the notch 35 means that relative movement between the spring member and the notch is restricted by abutting against each other. Therefore, even if the gap S along the circumferential direction Dc exists between the positioning pin 51 and the nozzle ring 22, the nozzle ring 22 is restrained in the circumferential direction Dc relative to the bearing housing 10 by the spring member 52. As a result, since rattling of the nozzle ring 22 in the circumferential direction Dc relative to the bearing housing 10 is suppressed, even when external vibration is applied to the nozzle ring 22, the nozzle ring 22 is suppressed from vibrating in the circumferential direction Dc relative to the bearing housing 10. Accordingly, wear of the nozzle ring 22 and the positioning pin 51 is suppressed. As a result, the durability of the variable capacity mechanism 20 increases, and the merchantability of the turbocharger 1 is improved.

In the positioning pin 51 illustrated in FIG. 6, the positioning pin 51 is provided on the bearing housing 10, and the notch 34 is provided on the nozzle ring 22. Thus, the nozzle ring 22 can be easily manufactured by performing the processing of forming the notches 34 and 35 in the nozzle ring 22 in the same process.

In the nozzle ring 22 illustrated in FIG. 6, the nozzle ring 22 is biased in the direction (for example, circumferential direction Dc) intersecting the axial direction Ds and the radial direction Dr by the spring member 52 arranged side by side in the circumferential direction Dc of the nozzle ring 22 relative to the positioning pin 51. Therefore, the nozzle ring 22 is reliably restrained in the circumferential direction Dc relative to the bearing housing 10.

Note that, in the spring member 52 illustrated in FIG. 6, the spring member 52 having the base portion 54 and the biasing portion 55 is used, but the second elastic member that biases the nozzle ring so as to restrain the nozzle ring 22 in the circumferential direction Dc relative to the bearing housing 10 is not particularly limited thereto, and various modifications can be made. For example, the second elastic member may be a spring member or the like obtained by simply winding a metal thin plate.

Further, in the positioning pin 51 illustrated in FIG. 6, the positioning pin 51 provided on the bearing housing 10 is engaged with the notch 34 of the nozzle ring 22, but the first engagement portion engaged with the positioning pin 51 is not particularly limited to the notch 34. The first engagement portion may be, for example, an opening (hole) penetrating from the ring main surface 22*a* of the nozzle ring 22 to the ring back surface 22*b*, or may be a depression (recess) provided on the ring back surface 22*b* of the nozzle ring 22. The second engagement portion engaged with the spring member 52 attached to the bearing housing 10 is not particularly limited to the notch 35, and may be a hole or a recess.

Figure 9:
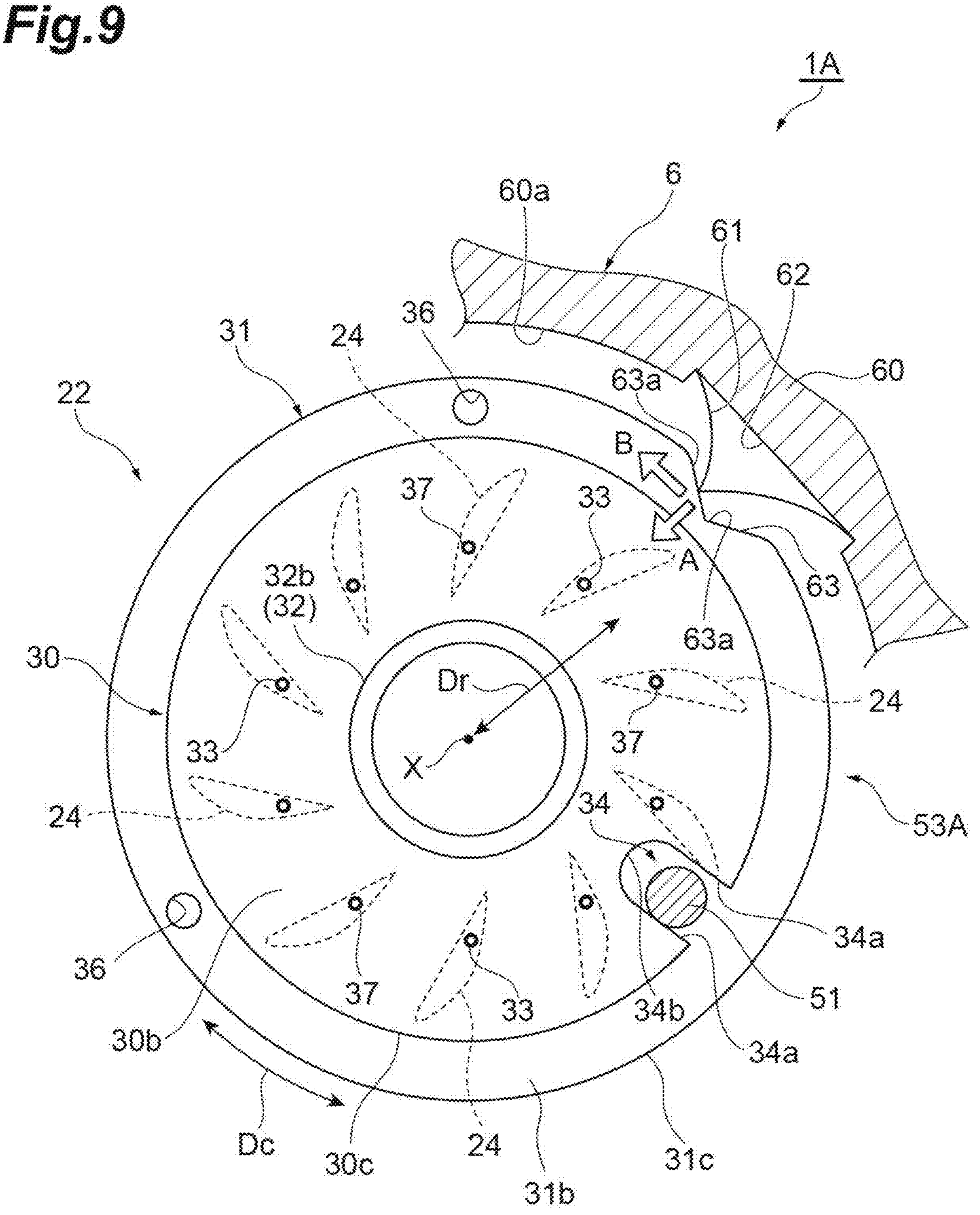
FIG. 9 is a plan view (including a partial cross section) illustrating a modification of the positioning unit together with the nozzle ring of an example turbocharger an example.

FIG. 9 is a plan view (including a partial cross section) illustrating a modification of the positioning unit together with the nozzle ring of an example turbocharger, and is a view corresponding to FIG. 4.

In FIG. 9, the turbocharger 1A includes a positioning unit 53A instead of the positioning unit 53 illustrated in FIG. 4. The positioning unit 53A includes the positioning pin 51 attached to the bearing housing 10 and a V-shaped spring member 61 attached to the turbine housing 6.

The spring member 61 is attached to an inner wall portion 60 of the turbine housing 6. The inner wall portion 60 includes an inner peripheral surface 60*a* facing the nozzle ring 22 in the radial direction Dr. The inner peripheral surface 60*a* faces the outer peripheral surface 31*c* of the outer flange portion 31 of the nozzle ring 22. The inner wall portion 60 is provided with a fixing recess 62. The fixing recess 62 is provided so as to form an opening in the inner peripheral surface 60*a*. Both ends of the spring member 61 are fixed to corners of the fixing recess 62. The spring member 61 is attached to the inner peripheral surface 60*a* of the turbine housing 6 and constitutes a second elastic member that biases the nozzle ring 22 in the direction intersecting the axial direction Ds and the radial direction Dr. The spring member 61 is an example of an elastic body.

Further, the positioning unit 53A has the notch 34 provided on the nozzle ring 22 and the notch 63 having a V-shape in plan view. The notch 63 is provided on the outer flange portion 31 of the nozzle ring 22. The notch 63 is provided so as to form an opening in the outer peripheral surface 31*c* of the outer flange portion 31. The notch 63 is provided at a position circumferentially separated from the notch 34 in the nozzle ring 22. The notch 63 has two tapered surfaces 63*a*. The tapered surface 63*a* is a surface that obliquely intersects with the radial direction Dr of the nozzle ring 22. The notch 63 constitutes a second engagement portion engaged with the spring member 61. The notch 63 is an example of an elastic body engagement portion that engages with the spring member 61.

A distal end (central portion) of the spring member 61 is in contact with one tapered surface 63*a* of the notch 63. The spring member 61 urges one tapered surface 63*a* of the notch 63 radially inward of the nozzle ring 22 (see arrow A in the drawing). At this time, the nozzle ring 22 is also urged in the tangential direction by a combined component of biasing forces of the spring member 61 (see arrow B in the drawing).

The nozzle ring 22 illustrated in FIG. 9, is biased in the direction intersecting the axial direction Ds and the radial direction Dr by the spring member 61 attached to the inner peripheral surface 60*a* of the turbine housing 6. Therefore, the nozzle ring 22 is reliably restrained in the circumferential direction Dc relative to the bearing housing 10.

When the spring member 61 biases the tapered surface 63*a* of the notch 63 of the nozzle ring 22 radially inward of the nozzle ring 22, the nozzle ring 22 is biased in the direction intersecting the axial direction Ds and the radial direction Dr by the combined component of the biasing force. Therefore, with a simple structure, the nozzle ring 22 is restrained in the circumferential direction Dc relative to the bearing housing 10.

The V-shaped spring member 61 is used, but the second elastic member that biases the tapered surface 63*a* of the notch 63 of the nozzle ring 22 radially inward of the nozzle ring 22 is not particularly limited thereto, and various modifications can be made. For example, the second elastic member may be a normal coil spring or the like.

The notch 63 having a V-shape in plan view having the two tapered surfaces 63*a* is provided on the nozzle ring 22, but the example is not particularly limited thereto, and a notch having one tapered surface may be provided on the nozzle ring 22.

The spring member 61 biases the tapered surface 63*a* of the notch 63 radially inward of the nozzle ring 22 to bias the nozzle ring 22 in the direction intersecting the axial direction Ds and the radial direction Dr, but the example is not particularly limited to this form, and a structure in which the tapered surface 63*a* of the notch 63 is directly biased in the direction intersecting the axial direction Ds and the radial direction Dr of the nozzle ring 22 by the second elastic member may be adopted.

Further, the spring member 61 is attached to the inner peripheral surface 60*a* of the turbine housing 6, but the example is not particularly limited thereto, and the second elastic member such as the spring member 61 may be attached to the inner peripheral surface of the bearing housing 10 depending on the structure of the turbocharger 1A.

Figure 10:
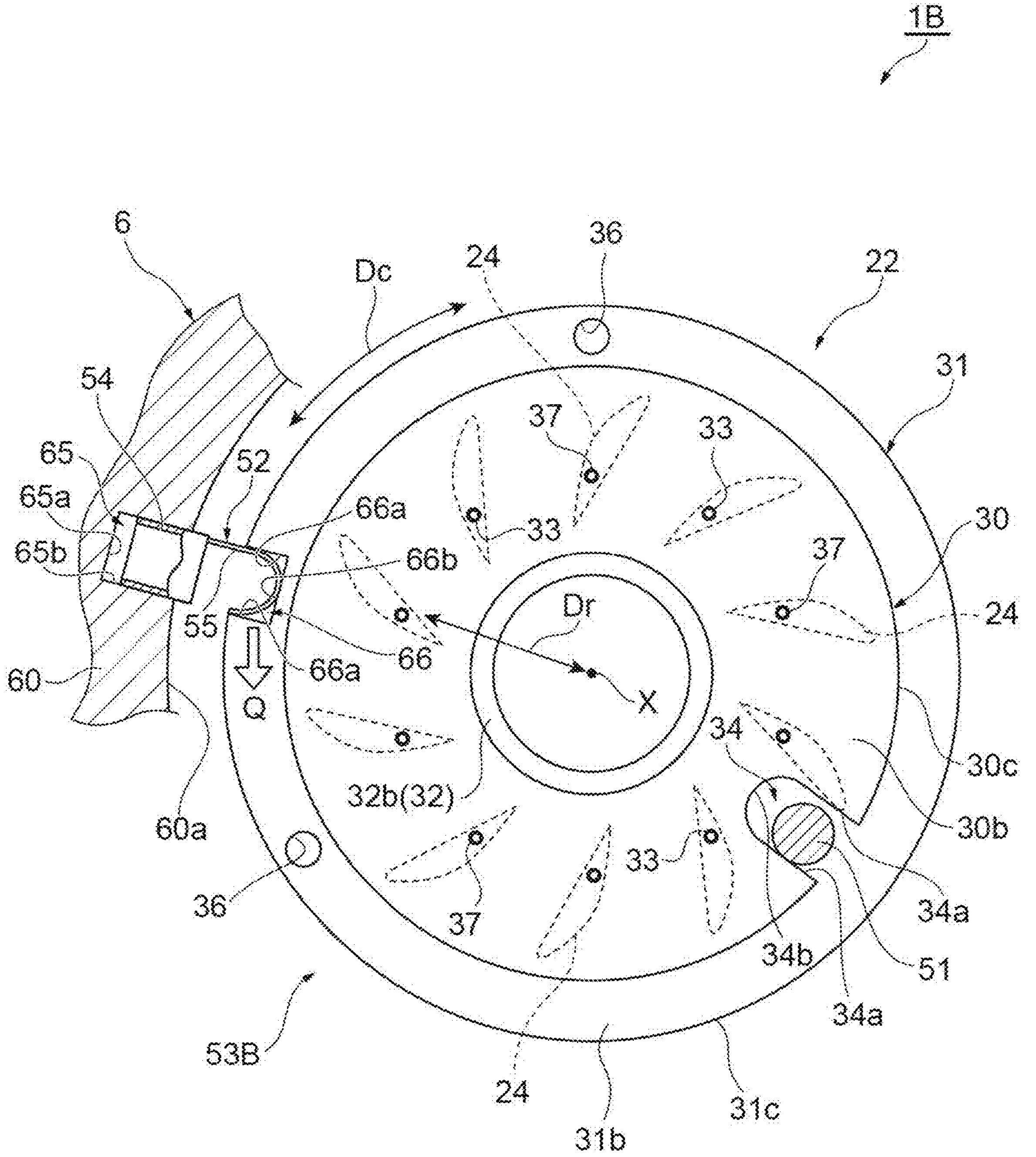
FIG. 10 is a plan view (including a partial cross section) illustrating another modification of the positioning unit together with the nozzle ring of an example turbocharger.

FIG. 10 is a plan view (including a partial cross section) illustrating another modification of the positioning unit of an example turbocharger, and is a view corresponding to FIG. 4.

In FIG. 10, a turbocharger 1B includes a positioning unit 53B instead of the positioning unit 53 illustrated FIG. 4. The positioning unit 53B has the positioning pin 51 attached to the bearing housing 10 and the spring member 52 attached to the turbine housing 6.

The spring member 52 is attached to the inner wall portion 60 of the turbine housing 6. The inner wall portion 60 includes an inner peripheral surface 60*a* facing the nozzle ring 22 in the radial direction Dr. The inner wall portion 60 is provided with an attachment hole 65 having a circular cross section. The attachment hole 65 is provided so as to form an opening in the inner peripheral surface 60*a*. The attachment hole 65 has a circular bottom surface 65*a* and a peripheral surface 65*b*. The base portion 54 of the spring member 52 is fixed to the inner wall portion 60 in a state of being inserted into the attachment hole 65. The spring member 52 is attached to the inner peripheral surface 60*a* of the turbine housing 6 and constitutes a second elastic member that biases the nozzle ring 22 in the direction intersecting the axial direction Ds and the radial direction Dr. The spring member 52 is an example of an elastic body.

Further, the positioning unit 53B has the notch 34 provided on the nozzle ring 22 and the notch 66 having a rectangular shape in plan view. The notch 66 is provided on the outer flange portion 31 of the nozzle ring 22. The notch 66 is provided so as to form an opening on the outer peripheral surface 31*c* of the outer flange portion 31. The outer peripheral surface 31*c* of the outer flange portion 31 faces the inner peripheral surface 60*a* of the inner wall portion 60. The notch 66 is provided at a position circumferentially separated from the notch 34 in the nozzle ring 22.

The notch 66 has two inner surfaces 66*a* facing each other in the circumferential direction Dc of the nozzle ring 22, and a planar inner bottom surface 66*b* connecting the inner surfaces 66*a*. The two inner surfaces 66*a* are formed so as to be parallel to each other, for example. The notch 66 constitutes a second engagement portion engaged with the spring member 52. The notch 66 is an example of an elastic body engagement portion that engages with the spring member 52.

A distal end of the biasing portion 55 of the spring member 52 is in contact with one inner surface 66*a* of the notch 66. The spring member 52 biases one inner surface 66*a* of the notch 66 in the direction intersecting the axial direction Ds and the radial direction Dr of the nozzle ring 22 (see an arrow Q in the drawing). The spring member 52 does not bias the other inner surface 66*a* of the notch 66 in the direction intersecting the axial direction Ds and the radial direction Dr of the nozzle ring 22.

The spring member 52 biases the one inner surface 66*a* of the notch 66 of the nozzle ring 22, so that the nozzle ring 22 is directly biased in the direction intersecting the axial direction Ds and the radial direction Dr. Therefore, with a simple structure, the nozzle ring 22 is restrained in the circumferential direction Dc relative to the bearing housing 10.

Note that, the J-shaped spring member 52 is used, but the second elastic member that biases only the one inner surface 66*a* of the notch 66 of the nozzle ring 22 is not particularly limited thereto, and various modifications can be made.

Further, the notch 66 having a rectangular shape in plan view is provided on the nozzle ring 22, but the shape of the notch is not particularly limited thereto as long as the notch has two inner surfaces facing each other in the circumferential direction Dc of the nozzle ring 22, and may be a U-shape in plan view similarly to the notch 34, or may be a trapezoidal shape or the like in plan view.

Further, depending on the structure of the turbocharger 1B, the second elastic member such as the spring member 52 may be attached to the inner peripheral surface of the bearing housing 10 instead of the turbine housing 6.

Figure 11:
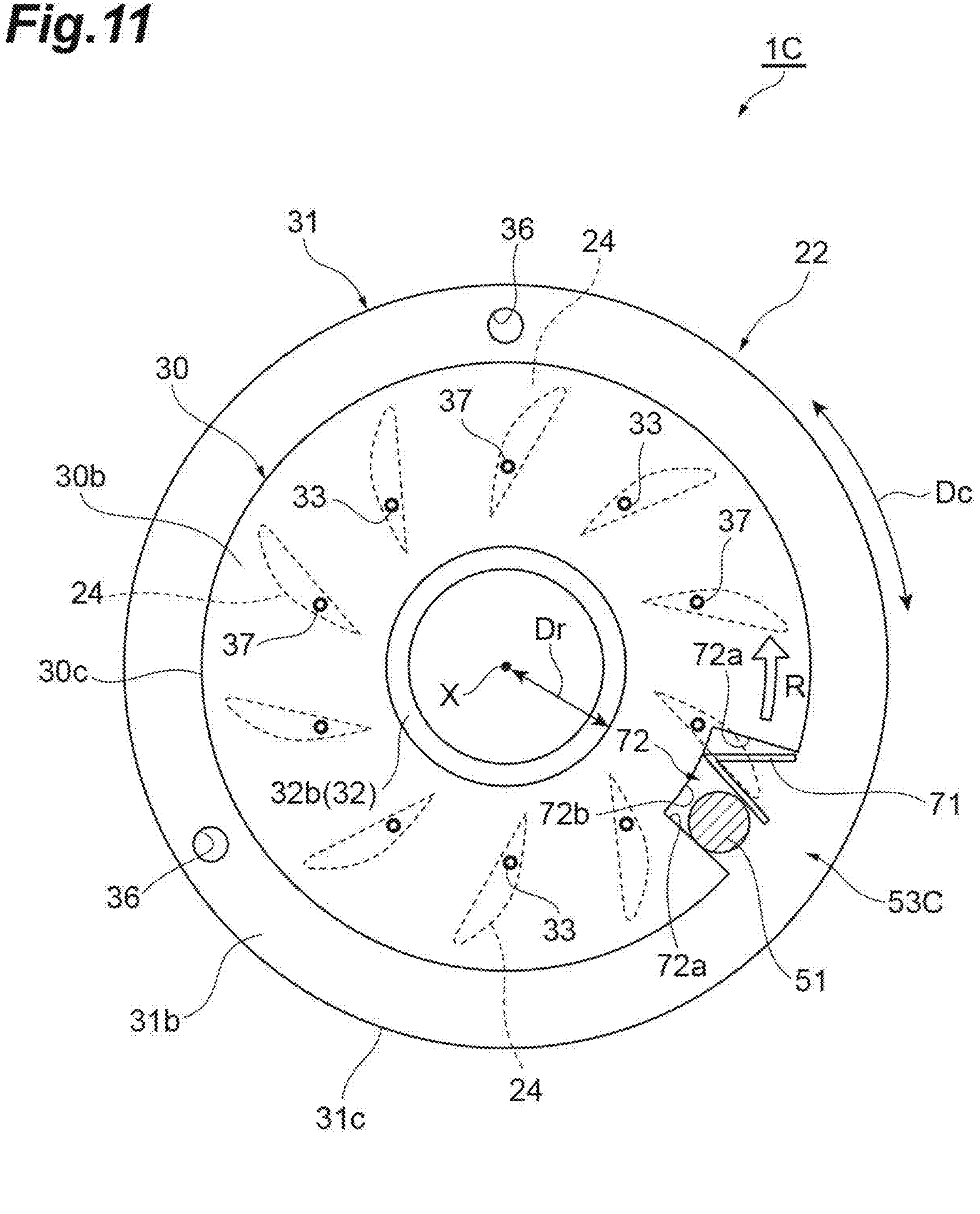
FIG. 11 is a plan view (including a partial cross section) illustrating still another modification of the positioning unit together with the nozzle ring of an example turbocharger.

FIG. 11 is a plan view illustrating still another modification of the positioning unit of an example turbocharger, and is a view corresponding to FIG. 4.

In FIG. 11, a turbocharger 1C includes a positioning unit 53C instead of the positioning unit 53 illustrated in FIG. 4. The positioning unit 53C includes the positioning pin 51 attached to the bearing housing 10 and a V-shaped spring member 71 provided on the nozzle ring 22. The spring member 71 constitutes a second elastic member that biases the nozzle ring 22 in the direction intersecting the axial direction Ds and the radial direction Dr. The spring member 71 is an example of an elastic body.

Further, the positioning unit 53C includes a notch 72 provided on the nozzle ring 22 and having a substantially rectangular shape in plan view. The notch 72 is provided on the ring main body 30 so as to open on the outer peripheral surface 30*c* of the ring main body 30 of the nozzle ring 22. The notch 72 has two inner surfaces 72*a* facing each other in the circumferential direction De of the nozzle ring 22, and a substantially planar inner bottom surface 72*b* connecting the inner surfaces 72*a* to each other. The notch 72 constitutes a first engagement portion engaged with the positioning pin 51 and constitutes a second engagement portion engaged with the spring member 71. That is, the notch 72 is one common engagement portion constituting the first engagement portion and the second engagement portion. The notch 72 is an example of an elastic body engagement portion that engages with the spring member 71.

The spring member 71 is disposed in the notch 72 together with the positioning pin 51. The spring member 71 is disposed in the notch 72 so as to be adjacent to the positioning pin 51 in the circumferential direction Dc. One end of the spring member 71 is in contact with the positioning pin 51. The other end of the spring member 71 is in contact with one inner surface 72*a* of the notch 72. The spring member 71 biases the nozzle ring 22 in the direction intersecting the axial direction Ds and the radial direction Dr by biasing one inner surface 72*a* of the notch 72 (see an arrow R in the drawing).

The spring member 71 is arranged in the notch 72 so as to be adjacent to the positioning pin 51 in the circumferential direction Dc of the nozzle ring 22, whereby the nozzle ring 22 is biased in the direction intersecting the axial direction Ds and the radial direction Dr by the spring member 71 even if the spring member 71 is not attached to the bearing housing 10 and the turbine housing 6. Therefore, the nozzle ring 22 is restrained in the circumferential direction Dc relative to the bearing housing 10 while simplifying the structure of the bearing housing 10 or the turbine housing 6.

Note that, the V-shaped spring member 71 is used, but the second elastic member that biases the one inner surface 72*a* of the notch 72 of the nozzle ring 22 is not particularly limited thereto, and various modifications can be made.

Further, the notch 72 is provided on the nozzle ring 22, but the common engagement portion to be engaged with the positioning pin 51 and the spring member 71 is not particularly limited to the notch 72, and may be a hole penetrating from the ring main surface 22*a* of the nozzle ring 22 to the ring back surface 22*b*, or may be a hole (recess) opening in the ring back surface 22*b* of the nozzle ring 22.

Although several examples have been described above, the present disclosure is not limited to the above examples. In one or more of the above examples, the notch engaged with the second elastic member is provided as the second engagement portion in the nozzle ring 22, but the present disclosure is not particularly limited to such a form. For example, a projection to be engaged with the second elastic member may be provided on the nozzle ring 22 as a second engagement portion, or the outer peripheral surface 30*c* or the outer peripheral surface 31*c* of the nozzle ring 22 may be a second engagement portion to be engaged with the second elastic member.

Further, in one or more of the above examples, the nozzle ring 22 is biased in the axial direction Ds relative to the turbine housing 6 by the spring member 40, but the present disclosure is not particularly limited thereto, and the nozzle ring 22 may be biased in the axial direction Ds relative to the bearing housing 10 by some elastic body depending on the structure of the turbocharger.

Further, in on or more of the above examples, only one positioning pin 51 is provided on the bearing housing 10, but the number of positioning pins 51 may be plural. Further, the number of the second elastic members may be plural.

Further, in one or more of the above examples, the positioning pin 51 is provided on the bearing housing 10, and the first engagement portion engaged with the positioning pin 51 is provided on the nozzle ring 22, but the present disclosure is not particularly limited to such a form. The positioning pin 51 may be provided on the nozzle ring 22, and the first engagement portion may be provided on the bearing housing 10. In this case, the first engagement portion is, for example, a hole provided on the holding portion 50 of the bearing housing 10. It may be attached.

Figure 12:
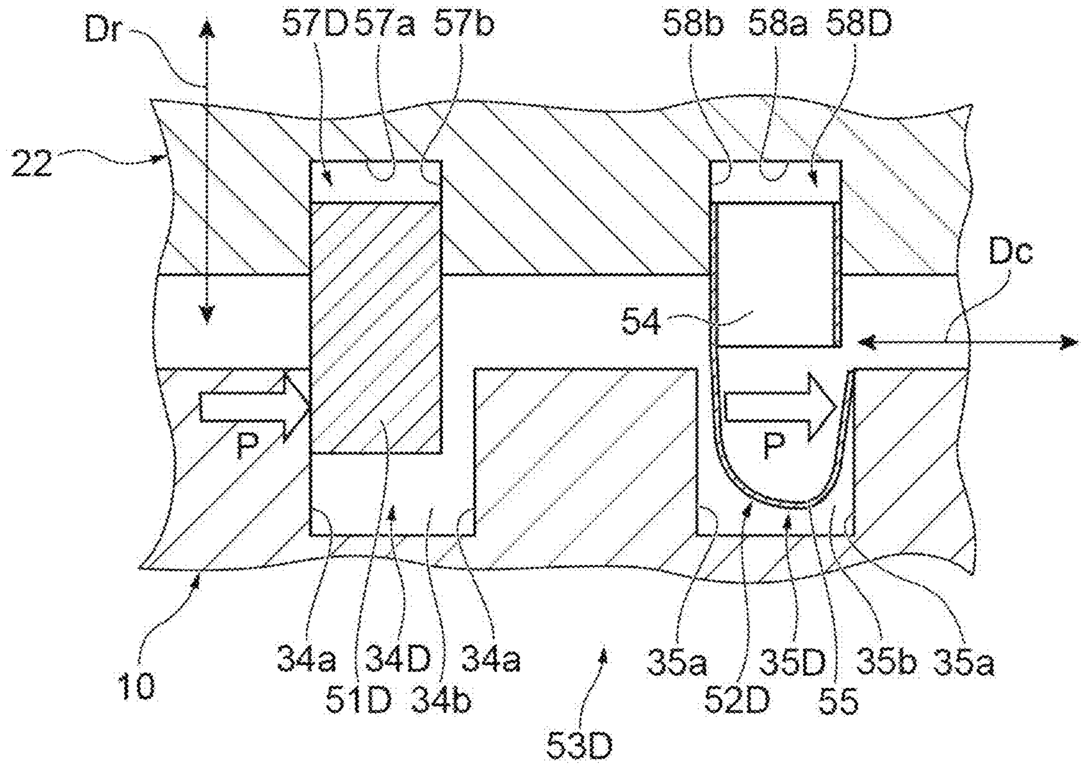
FIG. 12 is a cross-sectional view illustrating a positioning unit of an example turbocharger.

FIG. 12 is a cross-sectional view illustrating a positioning unit of an example turbocharger, and is a view corresponding to FIG. 6.

In FIG. 12, the turbocharger includes a positioning unit 53D instead of the positioning unit 53 illustrated in FIG. 1. The positioning unit 53D includes a positioning pin 51D and a spring member 52D. The positioning pin 51D has substantially the same structure as the positioning pin 51, and the spring member 52D has substantially the same structure as the spring member 52. Those same structures are denoted by the same reference numerals as the positioning pin 51 or the spring member 52.

The nozzle ring 22 is provided with attachment holes 57D and 58D. A part of the positioning pin 51D is inserted into the attachment hole 57D. A part of the base portion 54 of the spring member 52D is inserted into the attachment hole 58D. The positioning pin 51D is fixed to the nozzle ring 22 in a state of being inserted into the attachment hole 57D. The spring member 52D is fixed to the nozzle ring 22 in a state of being inserted into the attachment hole 58D.

The notches 34D and 35D are provided on the bearing housing 10. The notch 34D constitutes a first engagement portion engaged with the positioning pin 51D. The notch 34D is an example of a pin engagement portion. The notch 35D constitutes a second engagement portion engaged with the spring member 52. The spring member 52 is an example of an elastic body, and the notch 35D is an example of an elastic body engagement portion that engages with the spring member 52. The notches 34D and 35D have substantially the same structure as the notches 34 and 35, and the same structures are denoted by the same reference numerals as the notches 34 and 35.

The positioning pin 51D and the spring member 52D constitute a positioning unit 53D (for example, a positioning assembly) that positions the nozzle ring 22 in the circumferential direction Dc relative to the bearing housing 10 in cooperation with the notches 34D and 35D provided on the bearing housing 10.

The spring member 52D is attached to the nozzle ring 22 so as to be arranged side by side in the circumferential direction Dc of the nozzle ring 22 relative to the positioning pin 51D. The positioning pin 51D extends in the axial direction Ds toward the nozzle ring 22.

The spring member 52D constitutes a second elastic member that biases the nozzle ring 22 so as to restrain the nozzle ring in the circumferential direction Dc relative to the bearing housing 10. The spring member 52D biases the nozzle ring 22 in the direction intersecting the axial direction Ds and the radial direction Dr as a result of the biasing portion 55 interfering with and biasing the bearing housing 10. The direction intersecting the axial direction Ds and the radial direction Dr of the nozzle ring 22 is a circumferential direction Dc or a tangential direction of the nozzle ring 22. The tangential direction of the nozzle ring 22 is a direction perpendicular to the axial direction Ds and the radial direction Dr of the nozzle ring 22, and is a substantially circumferential direction Dc of the nozzle ring 22.

In the example turbocharger illustrated in FIG. 12, the positioning pin 51D and the spring member 52D are provided on the nozzle ring 22, and the notches 34D and 35D are provided on the bearing housing 10. However, in some examples, the positioning pin 51D and the notch 35D are provided on the nozzle ring 22 and the notch 34D and the spring member 52D are provided on the bearing housing 10.

It is to be understood that not all aspects, advantages and features described herein may necessarily be achieved by, or included in, any one particular example. Indeed, having described and illustrated various examples herein, it should be apparent that other examples may be modified in arrangement and detail.

Some additional examples are disclosed as follows, with continued reference to the drawings for convenience of description.

An example turbocharger (1) includes a turbine impeller (5) fixed to a shaft (4), a housing (6,10) that houses the turbine impeller (5) and the shaft (4) and rotatably supports the shaft (4), a nozzle ring (22) housed in the housing (6,10) and located radially outside the turbine impeller (5), a plurality of nozzle vanes (24) supported by the nozzle ring (22), and located along a circumferential direction of the nozzle ring (22), a first elastic member (40) configured to bias the nozzle ring (22) in an axial direction of the shaft (4) relative to the housing (6,10), and a positioning assembly (53) that includes a second elastic member (52) configured to bias the nozzle ring (22) so as to restrain the nozzle ring (22) in a circumferential direction relative to the housing (6,10).

In the turbocharger (1), the positioning assembly (53) may include a positioning pin (51) that extends in the axial direction to engage with a first engagement portion (34) so as to position the housing (6,10) and the nozzle ring (22).

In the turbocharger (1), the positioning assembly (53) may include a second engagement portion (35) configured to engage with the second elastic member (52).

In the turbocharger (1), the second elastic member (52) may be located on the housing (6,10), and the second engagement portion (35) may include a notch or a hole formed on the nozzle ring (22).

In the turbocharger (1), the second elastic member (52) may be located on the nozzle ring (22), and the second engagement portion (35) may be formed on the housing (6, 10).

In the turbocharger (1), the positioning assembly (53) may include the positioning pin (51) located on the housing (6,10), and the first engagement portion (34) that has a notch or a hole formed on the nozzle ring (22).

In the turbocharger (1), the second elastic member (52) may be attached to the housing (6,10) that is located side by side with the positioning pin (51) in the circumferential direction, and the second elastic member (52) may be configured to bias the nozzle ring (22) in a biasing direction intersecting an axial direction and a radial direction of the nozzle ring.

In the turbocharger (1), the biasing direction may include the circumferential direction or a tangential direction of the nozzle ring (22).

In the turbocharger (1), the positioning assembly (53) may include a second engagement portion (35) engaging with the second elastic member (52), the housing (6,10) may include an inner peripheral surface (60*a*) facing the nozzle ring (22) in the axial direction, and the second elastic member (52) may be located on the inner peripheral surface (60*a*) of the housing (6,10), and biases the nozzle ring (22) in a biasing direction intersecting an axial direction and a radial direction of the nozzle ring (22).

In the turbocharger (1), the positioning assembly (53) may include a second engagement portion (35) engaging with the second elastic member (52), the nozzle ring (22) may include an outer peripheral surface (30*c*) facing the housing (6,10) in a radial direction of the nozzle ring (22), the second engagement portion (35) may include a notch (34) that forms an opening in the outer peripheral surface (30*c*) of the nozzle ring (22) and has a tapered surface (63*a*), and the second elastic member (52) biases the tapered surface (63*a*) radially inward of the nozzle ring (22).

In the turbocharger (1), the positioning assembly (53) may include a second engagement portion (35) engaging with the second elastic member (52), the nozzle ring (22) may include an outer peripheral surface (30*c*) facing the housing (6,10) in a radial direction of the nozzle ring (22), the second engagement portion (35) may include a notch (34) that forms an opening in the outer peripheral surface (30*c*) of the nozzle ring (22) and has two inner surfaces facing each other in the circumferential direction, and the second elastic member (52) biases one of the two inner surfaces.

In the turbocharger (1), the positioning assembly (53) may include a positioning pin (51) provided on the housing (6,10) and extending in the axial direction of the nozzle ring (22), and a common engagement portion (72) provided on the nozzle ring (22), that engages with both of the positioning pin (51) and the second elastic member (52).

In the turbocharger (1), the second elastic member (52) may be located adjacent to the positioning pin in the circumferential direction at the common engagement portion (72), and biases the nozzle ring (22) in a biasing direction intersecting both the axial direction and a radial direction of the nozzle ring.

In the turbocharger (1), the nozzle ring (22) may include an outer peripheral surface (30*c*) facing the housing (6,10) in a radial direction of the nozzle ring (22), and a notch formed in the outer peripheral surface (30*c*) and housing the second elastic member (52). The second elastic member (52) may contact the notch and biases the notch in the circumferential direction.

An example turbocharger (1) includes a turbine impeller (5) fixed to a shaft (4), a nozzle ring (22) located radially outside the turbine impeller (5), a housing (6,10) that houses the turbine impeller (5) and the nozzle ring (22), a vane (24) supported by the nozzle ring (22), and a positioning assembly (53) that includes an elastic body configured to bias the nozzle ring (22) so as to restrain the nozzle ring (22) in a circumferential direction of the nozzle ring (22) relative to the housing (6,10).

In the turbocharger (1), the positioning assembly (53) may include a positioning pin (51) extending in an axial direction of the shaft (4), and a pin engagement portion (34) engaging with the positioning pin (51) to position the nozzle ring (22) in the circumferential direction relative to the housing (6,10).

In the turbocharger (1), the elastic body (52) and the positioning pin (51) may be located on the housing (6, 10).

In the turbocharger (1), the elastic body (52) may be located on the housing (6, 10), and the positioning assembly (53) may include an elastic body engagement portion (35) located on the nozzle ring (22) and engaging with the elastic body (52).

In the turbocharger (1), the elastic body (52) may be located on the nozzle ring (22), and the positioning assembly (53) may include an elastic body engagement portion (35) located on the housing (6, 10) and engaging with the elastic body (52).

In the turbocharger (1), the nozzle ring (22) may include an outer peripheral surface (30*c*) facing the housing (6,10) in a radial direction of the nozzle ring (22), and a notch formed in the outer peripheral surface (30*c*) and housing the elastic body (52). The elastic body (52) may contact the notch and biases the nozzle ring (22) in the circumferential direction.

What is claimed is:

1. A turbocharger comprising:
a turbine impeller fixed to a shaft;
a housing that houses the turbine impeller and the shaft and rotatably supports the shaft;
a nozzle ring housed in the housing and located radially outside the turbine impeller;
a plurality of nozzle vanes supported by the nozzle ring, and located along a circumferential direction of the nozzle ring;
a first elastic member configured to bias the nozzle ring in an axial direction of the shaft relative to the housing; and
a positioning assembly that includes:
a first engagement portion formed in the nozzle ring and including:
a first inner surface; and
a second inner surface that faces the first inner surface in the circumferential direction;
a positioning pin located on the housing and extending in the axial direction, the positioning pin contacting the first inner surface of the first engagement portion so as to position the housing and the nozzle ring, wherein a gap is defined between the positioning pin and the second inner surface; and
a second elastic member configured to bias the nozzle ring to maintain contact between the positioning pin and the first inner surface, thereby restrain the nozzle ring in the circumferential direction relative to the housing.

2. The turbocharger according to claim 1, wherein the positioning assembly includes a second engagement portion configured to engage with the second elastic member.

3. The turbocharger according to claim 1,
wherein the positioning assembly includes a second engagement portion configured to engage with the second elastic member, the second elastic member located on the housing, and
wherein the second engagement portion includes a notch or a hole formed on the nozzle ring.

4. The turbocharger according to claim 1,
wherein the positioning assembly includes a second engagement portion configured to engage with the second elastic member, the second elastic member located on the nozzle ring, and
wherein the second engagement portion is formed on the housing.

5. The turbocharger according to claim 1, wherein
the first engagement portion includes a notch or a hole formed on the nozzle ring.

6. The turbocharger according to claim 1,
wherein the positioning assembly includes a second engagement portion engaging with the second elastic member,
wherein the housing includes an inner peripheral surface facing the nozzle ring in the axial direction, and
wherein the second elastic member is located on the inner peripheral surface of the housing, and biases the nozzle ring in a biasing direction intersecting an axial direction and a radial direction of the nozzle ring.

7. The turbocharger according to claim 1,
wherein the positioning assembly includes a second engagement portion engaging with the second elastic member,
wherein the nozzle ring includes an outer peripheral surface facing the housing in a radial direction of the nozzle ring,
wherein the second engagement portion includes a notch that forms an opening in the outer peripheral surface of the nozzle ring and has a tapered surface, and
wherein the second elastic member biases the tapered surface radially inward of the nozzle ring.

8. The turbocharger according to claim 1,
wherein the positioning assembly includes a second engagement portion engaging with the second elastic member,
wherein the nozzle ring includes an outer peripheral surface facing the housing in a radial direction of the nozzle ring,
wherein the second engagement portion includes a notch that forms an opening in the outer peripheral surface of the nozzle ring and has two inner surfaces facing each other in the circumferential direction, and
wherein the second elastic member biases one of the two inner surfaces.

9. The turbocharger according to claim 1,
wherein
the positioning pin extends in the axial direction of the nozzle ring; and
wherein the positioning assembly includes a common engagement portion provided on the nozzle ring, that engages with both of the positioning pin and the second elastic member.

10. The turbocharger according to claim 1,
wherein the nozzle ring includes:
an outer peripheral surface facing the housing in a radial direction of the nozzle ring; and
a notch formed in the outer peripheral surface and housing the second elastic member, and
wherein the second elastic member contacts the notch and biases the notch in the circumferential direction.

11. The turbocharger according to claim 1, wherein the second elastic member is attached to the housing that is located side by side with the positioning pin in the circumferential direction.

12. The turbocharger according to claim 1, wherein the second elastic member is configured to bias the nozzle ring in a biasing direction intersecting an axial direction and a radial direction of the nozzle ring.

13. A turbocharger comprising:
a turbine impeller fixed to a shaft;

a housing that houses the turbine impeller and the shaft and rotatably supports the shaft;

a nozzle ring housed in the housing and located radially outside the turbine impeller;

a plurality of nozzle vanes supported by the nozzle ring, and located along a circumferential direction of the nozzle ring;

a first elastic member configured to bias the nozzle ring in an axial direction of the shaft relative to the housing; and a positioning assembly that includes a second elastic member configured to bias the nozzle ring so as to restrain the nozzle ring in a circumferential direction relative to the housing, wherein the positioning assembly comprises:

a positioning pin located on the housing; and a first engagement portion includes a notch or a hole formed on the nozzle ring, wherein the second elastic member is attached to the housing that is located side by side with the positioning pin in the circumferential direction, and wherein the second elastic member is configured to bias the nozzle ring in a biasing direction intersecting an axial direction and a radial direction of the nozzle ring.

14. The turbocharger according to claim 13, wherein the biasing direction includes the circumferential direction or a tangential direction of the nozzle ring.

15. A turbocharger comprising:

a turbine impeller fixed to a shaft;

a housing that houses the turbine impeller and the shaft and rotatably supports the shaft;

a nozzle ring housed in the housing and located radially outside the turbine impeller;

a plurality of nozzle vanes supported by the nozzle ring, and located along a circumferential direction of the nozzle ring;

a first elastic member configured to bias the nozzle ring in an axial direction of the shaft relative to the housing; and a positioning assembly that includes a second elastic member configured to bias the nozzle ring so as to restrain the nozzle ring in a circumferential direction relative to the housing, wherein the positioning assembly includes:

a positioning pin provided on the housing and extending in the axial direction of the nozzle ring; and a common engagement portion provided on the nozzle ring, that engages with both of the positioning pin and the second elastic member, and wherein the second elastic member is located adjacent to the positioning pin in the circumferential direction at the common engagement portion, and biases the nozzle ring in a biasing direction intersecting both the axial direction and a radial direction of the nozzle ring.

16. A turbocharger comprising:

a turbine impeller fixed to a shaft;

a nozzle ring located radially outside the turbine impeller;

a housing that houses the turbine impeller and the nozzle ring;

a vane supported by the nozzle ring;

a positioning assembly that includes:

an elastic body configured to bias the nozzle ring so as to restrain the nozzle ring in a circumferential direction of the nozzle ring relative to the housing; and a positioning pin extending in an axial direction of the shaft; and a pin engagement portion engaging with the positioning pin to position the nozzle ring in the circumferential direction relative to the housing, wherein the elastic body is located side by side with the positioning pin in a circumferential direction of the nozzle ring.

17. The turbocharger according to claim 16, wherein the elastic body and the positioning pin are located on the housing.

18. The turbocharger according to claim 16, wherein the elastic body is located on the housing, and wherein the positioning assembly further includes an elastic body engagement portion located on the nozzle ring and engaging with the elastic body.

19. The turbocharger according to claim 16, wherein the elastic body is located on the nozzle ring, and wherein the positioning assembly further includes an elastic body engagement portion located on the housing and engaging with the elastic body.

20. The turbocharger according to claim 16, wherein the nozzle ring includes:

an outer peripheral surface facing the housing in a radial direction of the nozzle ring; and a notch formed in the outer peripheral surface and housing the elastic body, and wherein the elastic body contacts the notch and biases the nozzle ring in the circumferential direction.

* * * * *